United States Patent [19]
Gallardo

[11] Patent Number: 5,239,849
[45] Date of Patent: Aug. 31, 1993

[54] AUTOMOBILE AND PROPERTY ANTI-THEFT APPARATUS

[76] Inventor: Gilberto Gallardo, 3103 Baldwin St., Los Angeles, Calif. 90031

[21] Appl. No.: 997,025

[22] Filed: Dec. 28, 1992

[51] Int. Cl.$^5$ .............................................. B60R 25/02
[52] U.S. Cl. ........................................ 70/209; 70/63; 70/226; 70/238
[58] Field of Search ......... 70/14, 57, 58, 63, 209–212, 70/225, 226, 238; 109/52, 59 R, 59 T

[56] References Cited

U.S. PATENT DOCUMENTS

| | | | |
|---|---|---|---|
| 3,636,742 | 1/1972 | Raney | 70/63 |
| 3,695,067 | 10/1972 | Bays | 70/63 |
| 3,742,741 | 10/1972 | Cahan | 70/63 |
| 3,934,434 | 1/1976 | Law | 70/63 |
| 4,577,477 | 3/1986 | Olshausen | 70/63 X |
| 4,809,890 | 3/1989 | Tsigadas | 70/63 X |
| 5,005,388 | 4/1991 | Lo | 70/226 X |
| 5,144,822 | 9/1992 | Jan et al. | 70/226 X |
| 5,174,138 | 12/1992 | Shen | 70/209 |

Primary Examiner—Peter M. Cuomo
Assistant Examiner—Suzanne L. Dino
Attorney, Agent, or Firm—Gary Appel

[57] ABSTRACT

A combination vehicle steering wheel locking and article protection apparatus comprises an elongate, rigid locking bar having joined at one end region a first, longitudinally—opening fork configured for fitting over a conventional vehicle steering wheel rim. Included are a second, longitudinally-opening fork configured for fitting over the steering wheel rim and means for enabling the second fork to slide longitudinally along the locking bar with both the first and second forks directed longitudinally outwardly in opposite directions. Locking means are mounted for longitudinally sliding along the locking bar intermediate the first and second forks, the locking means being operative for being locked to the locking bar in any selected one of a multitude of longitudinal positions. The apparatus includes a lock box having a bottom portion and a top portion, one of which is attached to the second fork and the other of which is attached to the locking means so that when opposing regions of the steering wheel rim are received into the first and second forks and the locking means are slid along the locking bar so that the lock box top portion closes the lock box bottom portion and is locked to the locking bar in that position, the steering wheel is locked between the first and second forks and the lock box is locked in its closed condition.

7 Claims, 2 Drawing Sheets

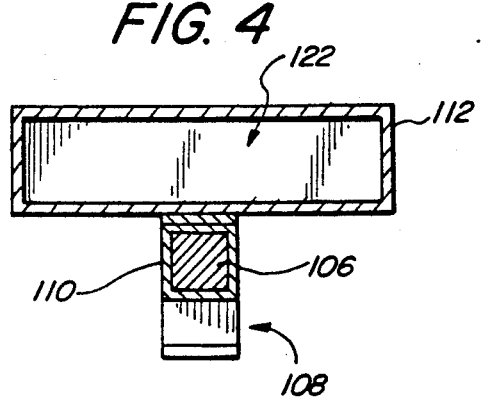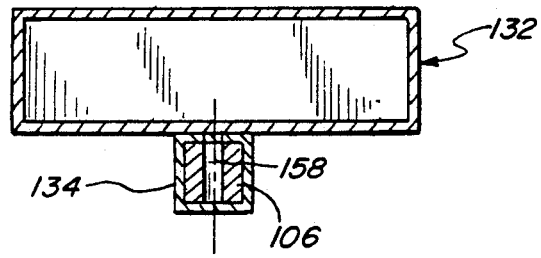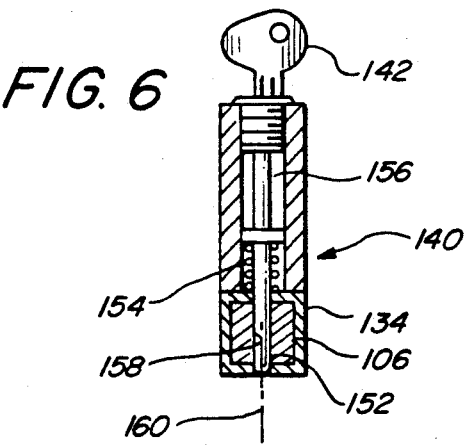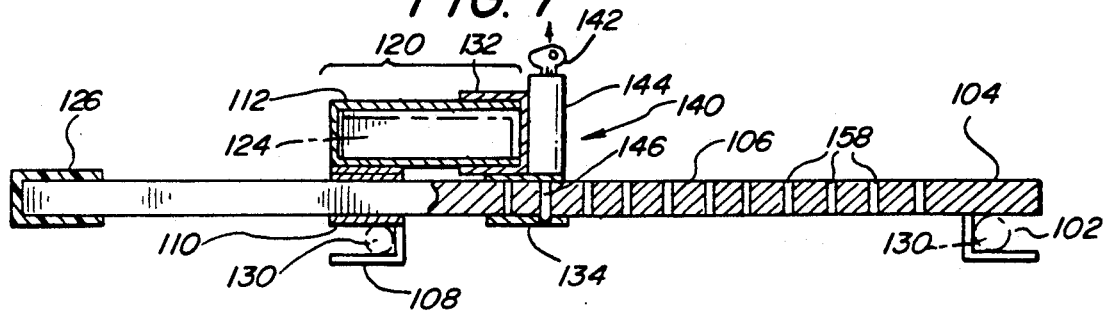

AUTOMOBILE AND PROPERTY ANTI-THEFT APPARATUS

BACKGROUND OF THE INVENTION

1. Field of the Invention

The present invention relates generally to the field of anti-theft apparatus for automobiles, and, more, particularly to automobile anti-theft apparatus of the type that locks onto an automobile steering wheel and, due to the projecting length of the apparatus, prevents the turning of the steering wheel, thereby rendering the automobile unsteerable.

2. Background Discussion

Because of high automobile theft rates in many regions of the United States as well as in many other countries in the world anti-theft apparatus are often installed in automobiles, either as factory installations or after market installations. Such anti-theft apparatus may consist of expensive motion sensors and unauthorized entry electronic systems that may cost several hundreds of dollars and require professional installation. A problem with many such electronic systems is false alarms which may be caused, for example, by an accidental touching of the automobile or by earth tremors such as may be caused by heavy equipment or earthquake jolts. As a result of such frequent false alarms, people seem to pay little attention to the resultant blaring of automobile horns and the flashing of automobile lights which might, in fact, be signaling an illegal entry of the vehicle.

Some relatively simple mechanical apparatus are alternatively (or, in some cases, additionally) used to deter automobile theft. The most common of such mechanical apparatus are apparatus that locks across a vehicle's steering wheel and projects sufficiently outwardly, in a radial direction, such that only limited turning of the steering wheel is possible. Thus, even if the manufacturer's steering wheel lock is forced, the mentioned mechanical lock across the steering wheel would prevent the steering of the vehicle.

An additional advantage of such steering wheel locking apparatus, typified by the widely advertised "CLUB" apparatus, is that they are readily visible from outside the vehicle. Although even such mechanical apparatus can be defeated by a determined automobile thief set on taking a particular make and model of automobile, they are considered to be an effective deterrent against joy-riders or thief of opportunity. Seeing a steering wheel disabled by such a locking apparatus, a potential auto thief can be expected to search for another automobile not so protected.

A further advantage of such apparatus is that they are relatively inexpensive, being found at most discount stores, and can also be readily moved from one automobile to another as the occasion may warrant. Another, perhaps less recognized advantage of such apparatus is their potential use as a defensive weapon if the driver is attacked.

Although, as above-mentioned, such steering wheel locking apparatus as the "CLUB" or similar apparatus are usually effective automobile theft deterrents, they still do not protect against the theft of valuables left in the automobile. For example, expensive stereos, tape decks or CD players may be inviting targets for thieves who may settle for such items if the automobile itself cannot be easily stolen. Other items, such small items as cameras, expensive sun glasses, portable cellular telephones, check books and even purses or wallets (which may be left in automobiles for "safety" by beach-goers) may be likely candidates for theft and ordinarily cannot safely be left in even locked automobiles For such reasons, it is desirable to provide an automobile anti-theft apparatus that is an effective deterrent for automobile theft but can also serve as a small "safe" for items that are, for one reason or another, left in automobiles. It is, accordingly a principle objective of the present invention to provide for both automobile anti-theft bar for the safe protection of small personal items that might otherwise be a good target for theft from an automobile.

SUMMARY OF THE INVENTION

In accordance with the present invention, a combination vehicle steering wheel locking and article protection apparatus comprises first and second forks configured for receiving thereinto a conventional vehicle steering wheel rim. Included are means enabling relative adjustable movement between the first and second forks so that the forks can engage opposite regions of the steering wheel rim. The apparatus of the invention further includes a lock box having bottom and top portions and locking means configured for locking the first and second forks relative to one another when the forks receive thereinto opposite regions of the steering wheel rim and for simultaneously locking the lock box bottom and top portions together for closing the box.

According to a preferred embodiment of the invention, the first fork is attached to one end of an elongate, rigid locking bar, there being included means for enabling the second fork to slide longitudinally along the locking bar with both the first and second forks directed longitudinally outwardly in opposite directions. Preferably, the locking means are mounted for longitudinally sliding along the locking bar intermediate the first and second forks, the locking means being operative for being locked to the locking bar in any selected one of a multitude of longitudinal positions.

It is further preferred that one of the bottom and top portions of the lock box is attached to the second fork so as to slide along the locking bar therewith, the other of the bottom and top portions being attached to the locking means so as to slide along the locking bar therewith. Consequently, when opposing regions of the steering wheel rim are received into the first and second forks and the locking means are slid along the locking bar until the lock box top portion closes the lock box bottom portion and is then locked to the locking bar in that position, the steering wheel is locked between the first and second forks and the lock box is locked closed.

The locking bar is preferably constructed having a number of spaced-apart locking apertures that are orthogonal to a longitudinal axis of the bar and the locking means include a locking pin that can be introduced and locked into a selected one of the locking apertures in the locking bar for locking the apparatus to the steering wheel rim and for locking the lock box in its closed condition. Also the lock box is preferably positioned on the opposite side of the locking bar from the second fork.

The apparatus is thus constructed for being locked to a vehicle steering wheel so as to disenable the steering wheel from being turned through a complete revolution and at the same time functions to close and lock a lock box, which is an integral part of the apparatus. Valuables can thus be placed in the lock box before it is closed by the locking means and when the apparatus is locked to the steering wheel the lock box is locked closed so as to prevent the opening thereof until the apparatus is unlocked from the steering wheel.

BRIEF DESCRIPTION OF THE DRAWINGS

The present invention can be more readily understood by a consideration of the following detailed description when taken in conjunction with the accompanying drawings, in which:

FIG. 4 is a transverse cross sectional drawing looking along line 4—4 of FIG. 2 showing one part of the lock box and how such, part is enabled to slide along the main steering wheel locking bar;

FIG. 5 is a transverse cross sectional drawing looking along line 5—5 of FIG. 2 showing the other part of the lock box and how such part is enabled to slide along the main steering wheel locking bar;

FIG. 6 is a transverse cross sectional drawing looking along line 6—6 of FIG. 3 showing the manner in which the second part of the lock box locks to the main locking bar and thereby also locks the locking bar in place on the steering wheel; and FIG. 7 is a longitudinal cross sectional view looking in the plane of FIG. 2 and showing the article lock box closed and locked to the main locking bar which is also locked to the steering wheel.

In the various FIGS. identical elements and features are given the same reference number.

DETAILED DESCRIPTION OF THE INVENTION

Figure 1:
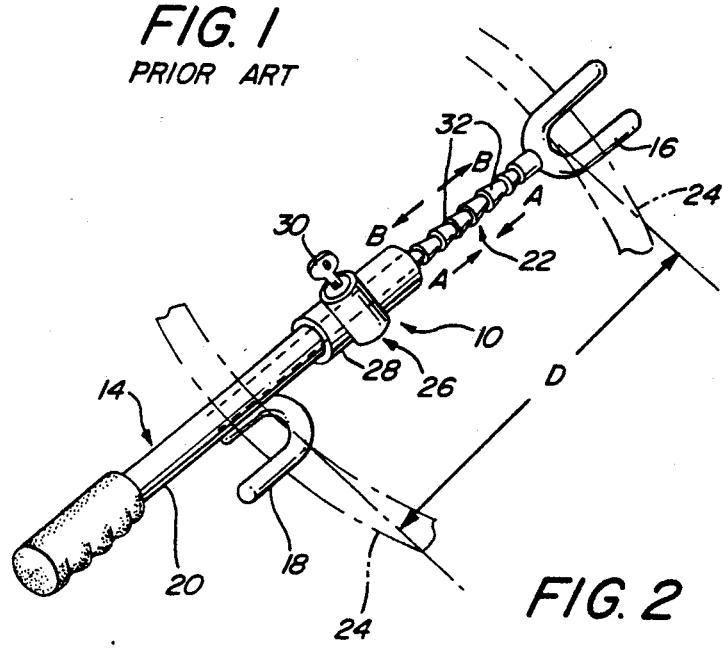
FIG. 1 is a perspective drawing of a representative prior art steering wheel locking apparatus which fits across a steering wheel and, when locked in place, limits rotational movement of the steering wheel such that the vehicle on which the apparatus is installed cannot be driven.

There is shown in FIG. 1, by way of further background and to assist in the understanding of the present invention, a conventional, prior art vehicle steering wheel locking apparatus 10. As shown, locking apparatus 10 comprises first and second members 12 and 14, respectively, the first member having a first, longitudinally-opening, U-shaped fork 16 and the second member having a second, longitudinally-opening, U-shaped fork 18. First fork 16 is at the end of first member 12, whereas second fork 18 is located on second member 14 so that a free end portion 20 of the second member extends longitudinally well beyond the second fork. Apparatus 10 is constructed so that a rod portion 22 of first member 12 is slidingly disposed within second member 14, which is necessarily tubular in the region receiving the rod portion of the first member.

To install apparatus 10 onto a steering wheel or steering wheel rim 24 (shown in phantom lines) the distance, D, between first and second forks 16 and 18 is reduced, by telescoping members 12 and 14 (Arrows A) so that open ends of the forks fit inside the rim. Then first and second members 12 and 14 are extended relative to one another (Arrows B) until the forks receivingly engage wheel rim 24, as shown in FIG. 1. A locking mechanism 26, which forms part of apparatus 10 and is joined to a proximal end region 28 of second member 14, is actuated by a key 30 so as to internally lock to one of a series of cone-shaped locking recesses 32 formed along first member portion 22. Locking of first and second members 12 and 14 together as above-described may be achieved merely by the removal of key 30 from locking mechanism 26; in which case, the two members are unlocked from one another by the reinsertion of the key into the locking mechanism.

Projecting portion 20 of second member 14 is made sufficiently long and projecting so that the steering wheel 24 can only be rotated a partial revolution without the projecting portion being stopped against the vehicle's windshield or other part of the vehicle interior. As a result, the vehicle cannot be driven even if the engine is somehow started and the factory-installed ignition and steering wheel lock is somehow defeated.

THE PRESENT INVENTION—FIGS. 2-7

Figure 2:
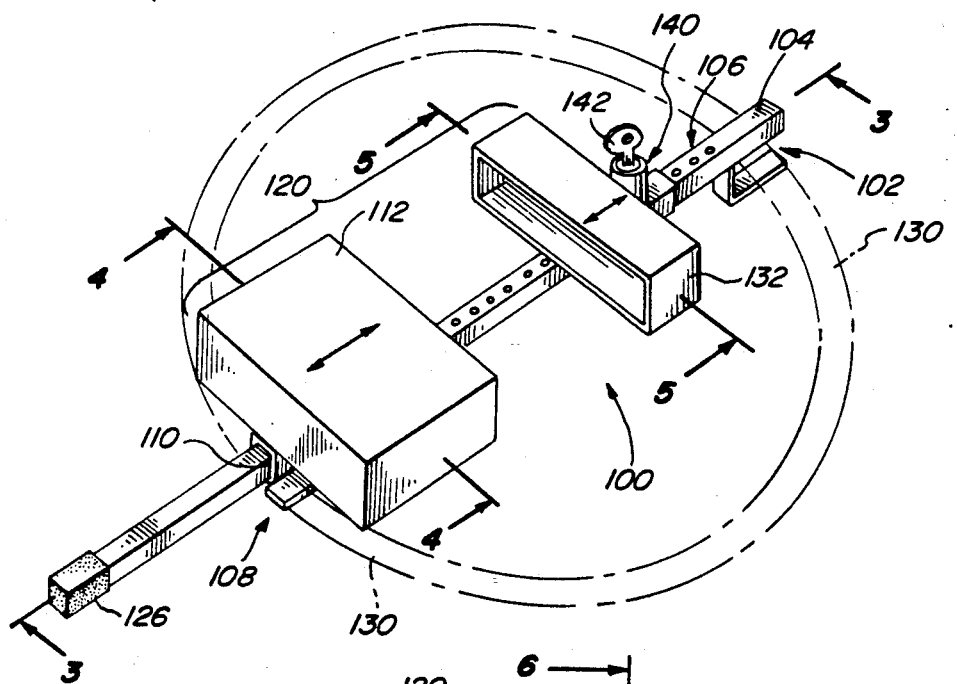
FIG. 2 is a perspective drawing of a steering wheel locking and article protection apparatus in accordance with the present invention, showing the apparatus installed across a vehicle steering wheel in the manner of the prior art apparatus of FIG. 1.

According to a preferred embodiment of the present invention, there is depicted in FIG. 2 a combination steering wheel lock and integral lock box apparatus 100. Shown comprising apparatus 100 is a first steering wheel rim engaging fork 102 which is attached at an outboard end region 104 of an elongate, rigid locking bar 106, one half of the fork, in fact, being formed by bar end region 104 (as better seen in FIG. 3). Locking bar 106 is preferably about one inch square in transverse cross section (FIGS. 4-6) and is preferably constructed of a strong metal such as steel.

Further comprising apparatus 100 is a second steering wheel engaging fork 108 (FIGS. 2 and 3) which is slidingly mounted on locking bar 106 by a short sleeve 110 which fits closely over the bar. Fixed to sleeve 110 is a first portion 112 of a rectangular lock box 120. As depicted first portion 112 of lock box 120 comprises the bottom part of the box and has a recess 122 for holding an object 124 (shown in phantom lines in FIG. 3) such as a removable stereo radio. First lock box portion 112 is open is open in a direction away from the open direction of second fork 108.

It is apparent from the foregoing that lock box portion 112 slides along locking bar 106 with second fork 108, either toward or away from first fork 102 (which, as above-described, is fixed to end region 104 of the bar) in the respective directions of Arrows C and D. Although lock box portion 112 and second fork 108 may be free to slide off from locking bar 106, they are preferably retained thereon by an enlarged end region or handle 126 formed at the end of the bar remote from first fork 102. It is, however, apparent from FIGS. 2 and 3 that when first and second forks 102 and 108 are in locking engagement with a steering wheel or steering wheel rim 130 (shown in phantom lines), lock box portion 112 is confined to locking bar 106 even if it is not otherwise retained on the locking bar.

Figure 3:
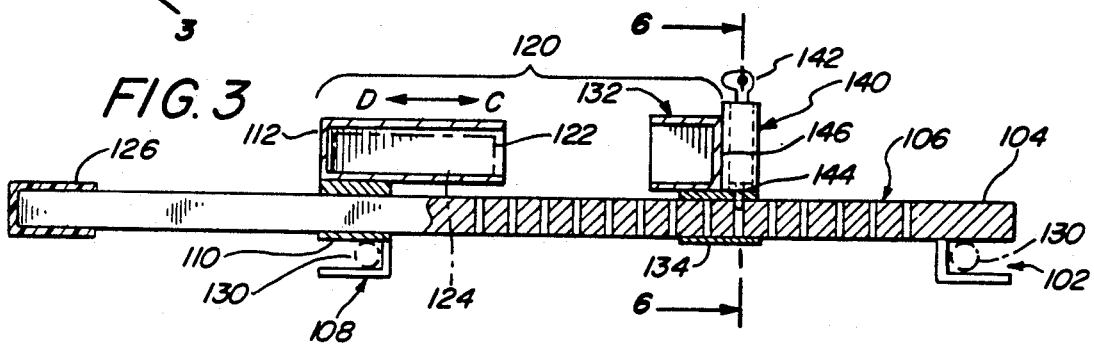
FIG. 3 is a longitudinal cross sectional drawing looking along line 3—3 of FIG. 2, showing the manner in which the apparatus is installed across a vehicle steering wheel and showing a lock-box portion of the apparatus in the open condition.

A second portion 132 of lock box 120 is slideably mounted on locking bar 106 by a sleeve 134 which is similar to above-described sleeve 110 associated with second fork 108. As depicted in FIGS. 2, 3 and 7, lock box portion 132 is a cover portion that fits over, and thereby closes, the open end of first lock box portion 112 when the two portions are brought together in the manner described below. Accordingly, an open end of second lock box portion 132 faces the open end of first lock box portion 112. As further shown in such FIGS., second lock box portion 132 is installed on locking bar 106 intermediate first and second forks 102 and 108 and is free to slide along the bar (on sleeve 134) therebetween.

Lock box portions 112 and 132 are preferably formed, by welding, of sheet metal, preferably sheet steel having a thickness of about 1/16 of an inch for strength and to resist efforts to pry open the box when it is locked closed. Although lock box 120 can be constructed in any convenient size, a preferred size is about eight inches wide, about six inches deep and about two to three inches high.

Locking means 140, which is actuated by a key 142, are fixed to an upper surface 144 of sleeve 134 and a top surface 146 of second lock box portion 132. Locking means 140 functions to lock second lock box portion 132 and its mounting sleeve 134 to a selected position along locking bar 106, as more particularly described below.

Locking means 140 may, by way of example, comprise a pin 152 upwardly biased by a compression spring 154 (FIG. 6). A locking mechanism 156, actuated by key 142, is operative for pushing pin 152 downwardly, against the force of spring 154, into an appropriate one of a number of longitudinally spaced apart apertures 158 formed along locking bar 106 parallel to an axis 160 of locking means 140. When key 142 is removed from locking mechanism 156, pin 152 is locked in its extended position in one of apertures 158.

The operation of apparatus 100 is considered to be readily apparent from the above description and the accompanying FIGS. 2-7. Nevertheless, a brief description is provided. Key 142 is inserted (or left) in locking means 140 and the locking means and second lock box portion 132 are slid along locking bar 106 to first fork 102. Second fork 108 and first lock box portion 112 are likewise slid toward first fork 102 which is then slid into engagement with steering wheel (rim) 130. Then, second fork 108 and lock box portion 112 are slid along locking bar 106 away from first fork 102 until the second fork slides into engagement with another region of steering wheel 130 opposite to the region engaged by the first fork. Then locking means 140 and second lock box portion 132 are slid along locking bar 106 until the second lock box portion tightly closes first lock box portion 112 and pushes second fork 108 tightly against steering wheel 130. Key 142 is then removed from (or actuates) locking mechanism 156 so as to force locking pin 152 into the closest one of locking bar apertures 158 so as to lock apparatus 100 to steering wheel 130 and lock box 120 closed. Apertures 158 are preferably spaced closely enough together such that pin 152 can be forced into one of the apertures without causing apparatus 100 to be excessively loose on steering wheel 130. Apparatus is removed from steering wheel 130 in the reverse manner of its installation.

Although there has been described and illustrated a steering wheel locking apparatus with an integrated article lock box in accordance with the present invention for purposes of illustrating the manner in which the invention may be used to advantage, it is to be appreciated that the invention is not limited thereto. Therefore, any and all variations and modifications of this invention that may occur to those skilled in art are to be considered as being within the scope and spirit of the claims as appended hereto.

What is claimed is:

1. A combination vehicle steering wheel locking and article protection apparatus, the apparatus comprising:
   a. an elongate, rigid locking bar having joined at one end region a first, longitudinally-opening fork configured for fitting over a conventional vehicle steering wheel rim;
   b. a second, longitudinally-opening fork configured for fitting over said steering wheel rim and means for enabling said second fork to slide longitudinally along said locking bar with both the first and second forks directed longitudinally outwardly in opposite directions;
   c. locking means mounted for longitudinally sliding along said locking bar intermediate said first and second forks, said locking means being operative for being locked to said locking bar in a multitude of longitudinal positions; and
   d. a lock box having a bottom portion and a top portion, one of said bottom and top portions being attached to said second fork and the other of said bottom and top portions being attached to said locking means so that when opposing regions of said steering wheel rim are received into said first and second forks and the locking means are slid along the locking bar so that the lock box top portion closes the lock box bottom portion and is locked to the locking bar in that position, the steering wheel is locked between the first and second forks and the lock box is locked closed.

2. The combination vehicle steering wheel locking and article protection apparatus as claimed in claim 1, wherein the lock box is positioned on the opposite side of the locking bar from the second fork.

3. The combination vehicle steering wheel locking and article protection apparatus as claimed in claim 1, wherein said locking bar is constructed having a number of spaced-apart locking apertures that are orthogonal to a longitudinal axis of said bar.

4. The combination vehicle steering wheel locking and article protection apparatus as claimed in claim 3, wherein said locking means include a locking pin that can be introduced and locked into a selected one of said locking apertures in said locking bar for locking the apparatus to said steering wheel rim and for locking said lock box in its closed condition.

5. A combination vehicle steering wheel locking and article protection apparatus, the apparatus comprising:
   a. an elongate, rigid locking bar having joined at one end region a first, longitudinally-opening fork configured for fitting over a conventional vehicle steering wheel rim;
   b. a second, longitudinally-opening fork configured for fitting over said steering wheel rim and means for enabling said second fork to slide longitudinally along said locking bar with both the first and second forks directed longitudinally outwardly in opposite directions;
   c. locking means mounted for longitudinally sliding along said locking bar intermediate said first and second forks, said locking means being operative for being locked to said locking bar in a multitude of longitudinal positions; and
   d. a lock box positioned on the opposite side of the locking bar from the second fork, said lock box having a bottom portion and a top portion, one of said bottom and top portions being attached to said second fork and the other of said bottom and top portions being attached to said locking means so that when opposing regions of said steering wheel rim are received into said first and second forks and the locking means are slid along the locking bar so that the lock box top portion closes the lock box bottom portion and is locked to the locking bar in that position, the steering wheel is locked between the first and second forks and the lock box is locked closed.

6. The combination vehicle steering wheel locking and article protection apparatus as claimed in claim 5, wherein said locking bar is constructed having a number of spaced-apart locking apertures that are orthogonal to a longitudinal axis of said bar and wherein said locking means include a locking pin that can be introduced and locked into a selected one of said locking apertures in said locking bar for locking the apparatus to said steering wheel rim and for locking said lock box in its closed condition.

7. A combination vehicle steering wheel locking and article protection apparatus, the apparatus comprising:
  a. first and second forks configured for receiving thereinto a conventional vehicle steering wheel rim, said first fork being attached to one end of an elongate, rigid locking bar;
  b. means enabling relative adjustable movement between the first and second forks so that the forks can engage opposite regions of said steering wheel rim, said adjustable movement means including means for enabling said second fork to slide longitudinally along said locking bar with both the first and second forks directed longitudinally outwardly in opposite directions;
  c. a lock box having bottom and top portions; and
  d. locking means configured for locking said first and second forks relative to one another when the forks receive said opposite regions of the steering wheel rim and for simultaneously locking said box bottom and top portions together for closing said lock box, said locking means being mounted for longitudinal sliding along said locking bar intermediate said first and second forks, said locking means being operative for being locked to said locking bar in a multitude of longitudinal positions, and one of said bottom and top portions of the lock box being attached to said second fork and the other of said bottom and top portions being attached to said locking means so that when opposing regions of said steering wheel rim are received into said first and second forks and the locking means are slid along the locking bar so that the lock box top portion closes the lock box bottom portion and is locked to the locking bar in that position, the steering wheel being locked between the first and second forks and the lock box being locked closed.

* * * * *